United States Patent
Bledsoe, Jr.

[15] 3,671,551
[45] June 20, 1972

[54] MYRCENE EPOXIDE DIELS-ALDER ADDUCTS

[72] Inventor: James O. Bledsoe, Jr., Jacksonville, Fla.
[73] Assignee: SCM Corporation, Cleveland, Ohio
[22] Filed: Dec. 8, 1969
[21] Appl. No.: 883,266

[52] U.S. Cl. .........................................260/348 R, 252/522
[51] Int. Cl. ............................................................C07d 1/12
[58] Field of Search.................................................260/348

[56] References Cited

UNITED STATES PATENTS

| 3,076,022 | 1/1963 | Kitchens | 260/488 |
| 3,513,176 | 5/1970 | Andrews et al. | 260/348 |

FOREIGN PATENTS OR APPLICATIONS 868,850  5/1961  Great Britain
672,025  12/1929  France

OTHER PUBLICATIONS

The Givaudan Index, second edition, (1961) pp. 148 and 153.
Paul Z. Bedoukian, Perfumery and Flavoring Synthetics (1967) p. 370
Chemical Abstracts, Vol. 66 (1967), p. 5261 (55590k).

*Primary Examiner*—Norma S. Milestone
*Attorney*—Merton H. Douthitt, Harold M. Baum, Howard G. Bruss, Jr. and Russell L. Brewer

[57] ABSTRACT

Diels-Alder adducts of myrcene epoxide have been found to exhibit excellent olfactory and perfumery properties. The adducts are made by reacting myrcene epoxide with an $\alpha\beta$-unsaturated carbonyl compound (dienophile), such as acrolein, in a Diels-Alder reaction. Additionally the adducts can be hydrogenated to form the saturated adduct which also possesses excellent olfactory properties.

4 Claims, No Drawings

MYRCENE EPOXIDE DIELS-ALDER ADDUCTS

Compounds having useful olfactory and perfumery properties have been synthesized by reacting myrcene and myrecenol with acrolein, methacrolein and crotonaldehyde in a Diels-Alder reaction. Structures of the products described in the prior art are as follows:

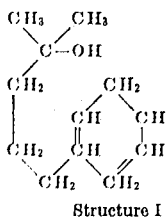
Structure I

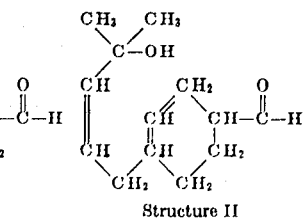
Structure II

Structure I is the Diels-Alder adduct of myrcenol and acrolein; Structure II is the Diels-Alder adduct of acrolein and a photo-oxidized and subsequently reduced myrcene product which is an unsaturated alcohol. The compound represented by Structure I is sold under the trademark "Lyral" by International Flavors and Fragrances, Inc.

Myrcene epoxide has also been synthesized and reacted in a Diels-Alder reaction with aliphatic dibasic acidic dienophiles such as maleic acid and maleic anhydride, mesaconic acid and the anhydride, and citraconic acid and the anhydride. These latter Diels-Alder adducts, however, do not possess enhanced perfumery properties as do the products described herein, but they are particularly advantageous in the formation of resinous materials.

Broadly, this invention relates to the synthesis of Diels-Alder adducts of myrcene epoxide and $\alpha,\beta$-unsaturated carbonyl compounds and their saturated counterparts.

Advantages of the Diels-Alder adducts of this invention include enhanced olfactory properties. Also, the composition can be easily prepared by the process techniques set forth herein.

The Diels-Alder adduct of myrcene epoxide and the $\alpha,\beta$-unsaturated carbonyl compound form a product with the epoxy group and the carbonyl group intact. Although not intending to be bound by theory, it is believed that the epoxide group and the aldehyde group compliment each other to produce a compound which would otherwise not exhibit olfactory properties. In other words, it is because of the difunctionality, that is, the epoxide group and the aldehyde, that the product exhibits enhanced olfactory properties.

Myrcene epoxide is represented by the formula below:

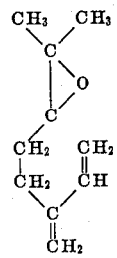

The epoxidation of the olefins is well known as is the epoxidation of myrcene. The epoxide is conventionally produced by reacting myrcene with peracetic acid in the presence of solvent and buffer, such as sodium acetate. Such a process is set forth in U.S. Pat. No. 3,002,950. The epoxidation of myrcene occurs at the isolated double bond.

The $\alpha,\beta$-unsaturated carbonyl compounds (dienophiles) of this invention are represented by the generic formula:

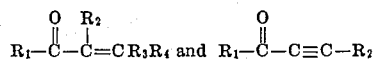

wherein $R_1$ represents a hydrogen or methyl group and $R_2$, $R_3$ and $R_4$ can be like or unlike groups selected from hydrogen, methyl, ethyl or phenyl. Examples of such dienophiles include crotonaldehyde, acrolein, methacrolein, propargyl aldehyde, mesityl oxide, methyl isopropenyl ketone, methyl vinyl ketone, cinnamaldehyde, and the like. A dienophile aldehyde, selected from the group of acrolein, methacrolein and crotonaldehyde is preferred in the reaction with myrcene epoxide because the resulting products have good olfactory and perfumery properties and subsist for lengthy periods of time.

Structures of reaction products of the dienophile and $\alpha,\beta$-unsaturated carbonyl compounds above are set forth below:

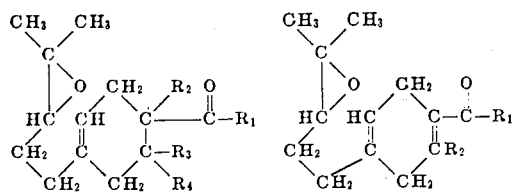

The Diels-Alder reaction is a well-known reaction for the 1,4 addition of a dienophile to a conjugated diene. Often the reactions are carried out between 0–150° C. In many instances the reaction is exothermic and heat must be removed rather than supplied. Those skilled in the art will appreciate the ramifications of this reaction and therefore it will not be discussed here.

It has also been found that the hydrogenated Deils-Alder adducts of myrcene epoxide have effective olfactory and perfumery properties. Usually, these hydrogenated products have a weaker note than their unsaturated counterparts. Thus, in most instances where a stronger fragrance is desired, the unsaturated adduct is preferred. The hydrogenation of the Diels-Alder adducts can be accomplished by employing known hydrogenation techniques with conventional hydrogenation catalysts. Typically a hydrogenation reaction is conducted under hydrogen at 50–60 psi using a palladium-on-carbon catalyst. Other hydrogenation processes are suitable for practicing this invention and such processes can be found in chemical synthesis texts.

The following examples are provided to illustrate specific embodiments of this invention and are not intended to restrict the scope thereof. All parts are parts by weight, all percentages are weight percentages, and all temperatures are in degrees Centigrade, unless otherwise specified.

EXAMPLE 1

Formation of Myrcene Epoxide

Myrcene epoxide (2,3-epoxy-2-methyl-6-methyleneoctene-7) with the isolated double bond being epoxided can be prepared as follows: 2657 parts of myrcene, 500 parts of sodium acetate and 10,000 parts of methylene chloride are treated by slow addition with a solution of 4107 parts peracetic acid at a temperature of −20° to −10° at atmospheric pressure. In about 4 hours the reaction is complete and myrcene epoxide is recovered by distillation. The product has a boiling point of 73° at 10 mm and an index of refraction of 1.4619 at 25° C. This distilled myrcene epoxide (2595 parts) is used in the Diels-Alder reaction for the following examples.

EXAMPLE 2

The Diels-Alder adduct of myrcene epoxide is formed as follows: 152 parts of the myrcene epoxide of Example 1 are charged to a vessel having agitation means and a reflux condenser. Then, 77 parts of crotonaldehyde and 1.5 parts of hydroquinone are added to the myrcene epoxide.

The mixture of myrcene epoxide, hydroquinone and crotonaldehyde is heated and refluxed gently until the temperature reaches 150° C. To recover the myrcene epoxide Diels-Alder adduct the contents are charged to the boiler pot in a distillation column and the reaction mixture is strip-distilled at a pressure of 1–2 mm mercury. About 75 parts of the adduct are obtained and, after refractionation, the purified product has a boiling point of 117–118 at 0.5 mm and an index of refraction of 1.4806 at a temperature of 25° C.

EXAMPLE 3

A Diels-Alder adduct of myrcene epoxide and methyl vinyl ketone is produced by substituting 90 parts methyl vinyl ketone for crotonaldehyde in Example 2 and following the procedures set forth therein. The Diels-Alder adduct of methyl vinyl ketone has useful perfumery properties.

EXAMPLE 4

A hydrogenated Diels-Alder adduct is prepared by mixing 20 parts of the myrcene epoxide-crotonaldehyde adduct from Example 2 with 100 ml of isopropanol and charging to a rocking bomb hydrogenation chamber. 0.5 parts of palladium-on-carbon catalyst are charged to the rocking bomb chamber and hydrogen is introduced until a pressure of 60–100 psi is obtained. The bomb, then, is heated and maintained at a temperature of 100° C. for two hours. The bomb is cooled to room temperature (25° C.) and the contents filtered to remove the catalyst. The filtrate is charged to a distillation column and the isopropanol solvent therein is removed under vacuum. The residual material is substantially without olefinic unsaturation and is found to possess useful olfactory and perfumery properties. The structure of such product is as follows:

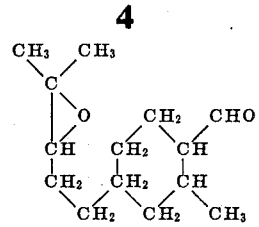

I claim:
1. A compound having the formula:

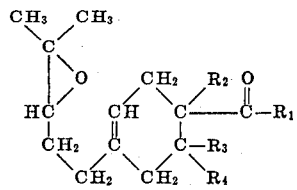

wherein $R_1$ represents a hydrogen or methyl group, $R_2$ and $R_3$ are hydrogen or a methyl group provided they are not methyl at the same time, and $R_4$ is a hydrogen group.

2. The compound of claim 1 wherein $R_1$, $R_2$, and $R_3$ are hydrogen.

3. The compound of claim 1 wherein $R_1$ is hydrogen, $R_2$ is hydrogen, and $R_3$ is methyl.

4. The compound of claim 1 wherein $R_1$ is hydrogen, $R_2$ is methyl, and $R_3$ is hydrogen.

* * * * *